(12) United States Patent
Hong

(10) Patent No.: US 11,394,938 B2
(45) Date of Patent: Jul. 19, 2022

(54) PROJECTION APPARATUS, SYSTEM AND PROJECTION METHOD

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 332 days.

(21) Appl. No.: 16/606,360

(22) PCT Filed: Apr. 8, 2019

(86) PCT No.: PCT/CN2019/081754
§ 371 (c)(1),
(2) Date: Oct. 18, 2019

(87) PCT Pub. No.: WO2019/218801
PCT Pub. Date: Nov. 21, 2019

(65) Prior Publication Data
US 2021/0409662 A1 Dec. 30, 2021

(30) Foreign Application Priority Data
May 17, 2018 (CN) .......................... 201810471550.X

(51) Int. Cl.
*H04N 9/31* (2006.01)
*G06T 7/80* (2017.01)

(52) U.S. Cl.
CPC ............. *H04N 9/3147* (2013.01); *G06T 7/80* (2017.01); *H04N 9/3176* (2013.01); *H04N 9/3185* (2013.01)

(58) Field of Classification Search
CPC .... G03B 21/006; G03B 21/008; G03B 21/28; G03B 21/147; G03B 21/208;
(Continued)

(56) References Cited

U.S. PATENT DOCUMENTS

| 8,284,216 B2 | 10/2012 | Matsuda |
| 9,691,357 B2 | 6/2017 | Li et al. |
| 2007/0115396 A1* | 5/2007 | Matsuda ................ H04N 9/317 348/744 |

(Continued)

FOREIGN PATENT DOCUMENTS

| CN | 1460918 A | 12/2003 |
| CN | 103728727 A | 4/2014 |
| CN | 104349096 A | 2/2015 |

(Continued)

OTHER PUBLICATIONS

International Search Report of PCT/CN2019/081754 in Chinese, dated Jun. 12, 2019, with English translation.

(Continued)

*Primary Examiner* — Sultan Chowdhury
(74) *Attorney, Agent, or Firm* — Collard & Roe, P.C.

(57) ABSTRACT

Embodiments of the present disclosure relate to a projection apparatus, a projection system and a projection method. The projection apparatus includes a region selection part, an image calibration part and a projection part. The image calibration part is respectively connected with the region selection part and the projection part. The region selection part is configured to select at least one projective region and send position information of the projective region to the image calibration part, the image calibration part is configured to acquire a relative positional relationship between the projective region and the projection part and calibrate an image to be displayed according to the relative positional relationship, and the projection part is configured to project the calibrated image to be displayed onto the projective region.

16 Claims, 6 Drawing Sheets

(58) Field of Classification Search
CPC ....... G06T 7/0004; G06T 7/0012; G06T 7/13; G06T 7/62; G06T 7/70; G06T 7/80; G06T 7/181; H04N 9/315; H04N 9/3147; H04N 9/3176; H04N 9/3185; H04N 9/3194
See application file for complete search history.

(56) References Cited

U.S. PATENT DOCUMENTS

| | | | |
|---|---|---|---|
| 2015/0102995 A1* | 4/2015 | Shen | G09G 5/00 345/156 |
| 2015/0268537 A1 | 9/2015 | Kinebuchi et al. | |
| 2017/0153450 A1* | 6/2017 | Ishii | G03B 21/10 |
| 2018/0075633 A1* | 3/2018 | Ichieda | G06T 11/60 |
| 2018/0157035 A1 | 6/2018 | Fujita | |
| 2018/0160053 A1* | 6/2018 | Tsuchiya | H04N 5/232127 |
| 2019/0026955 A1* | 1/2019 | Ogata | G06T 19/00 |
| 2020/0250411 A1* | 8/2020 | Hayashi | G06K 9/00791 |

FOREIGN PATENT DOCUMENTS

| | | |
|---|---|---|
| CN | 107921871 A | 4/2018 |
| CN | 108600716 A | 9/2018 |
| JP | 2017-003836 A | 1/2017 |
| JP | 2017-226292 A | 12/2017 |

OTHER PUBLICATIONS

Chinese Office Action in Chinese Application No. 201810471550.X, dated Nov. 13, 2019 with English translation.

* cited by examiner

PROJECTION APPARATUS, SYSTEM AND PROJECTION METHOD

CROSS REFERENCE TO RELATED APPLICATIONS

This application is the National Stage of PCT/CN2019/081754 filed on Apr. 8, 2019, which claims priority under 35 U.S.C. § 119 of Chinese Application No. 201810471550.X filed on May 17, 2018, the disclosure of which is incorporated by reference.

TECHNICAL FIELD

The present disclosure relates to a technical field of image processing, in particular to a projection apparatus, a projection system and a projection method.

BACKGROUND

In order to provide convenience for the driver to view the driving data, a head-up display device will be disposed on a driving platform of a vehicle. The head-up display device projects a 2D display image onto a windshield in front of the driver. When the driver's sight line converges to an imaging surface of the 2D display image, the 2D display image can be viewed.

In order to give the driver better viewing experience, a distance between an imaging surface of vehicle state information (vehicle speed, engine oil temperature, water temperature) in the 2D display image and the driver's eyes is about 2 meters; and a distance between an imaging surface of augmented reality information in the 2D display image (such as indication of external objects, navigation knowledge information, etc.) and the driver's eyes is 5 to 8 meters.

SUMMARY

At least one embodiment of the present disclosure provides a projection apparatus, the projection apparatus includes an region selection part, an image calibration part and a projection part, the image calibration part is respectively connected with the region selection part and the projection part, the region selection part is configured to select at least one projective region and send position information of the projective region to the image calibration part, the image calibration part is configured to acquire a relative positional relationship between the projective region and the projection part and calibrate an image to be displayed according to the relative positional relationship, and the projection part is configured to project the calibrated image to be displayed onto the projective region.

In some examples, the region selection part is configured to acquire the image to be displayed sent by the image calibration part, screen out the projective region from pre-stored projective regions according to a size of the image to be displayed, and feed back a position information of the projective region to the image calibration part.

In some examples, the projection apparatus further comprises an image acquisition part, the image acquisition part is connected with the region selection part and configured to acquire a depth image within a viewfinder coverage and send the depth image to the region selection part, data of pixels in the depth image contain depth information, and the region selection part is also configured to segment the depth image according to the depth information, screen out the projective region from segmented images, and send the position information of the projective region to the image calibration part.

In some examples, the image acquisition part is one or more of a binocular camera, a time-of-flight (TOF) camera and a structured light camera.

In some examples, the image acquisition part includes a TOF camera or a structured light camera; the image acquisition part includes at least one group of infrared emitter and infrared receiver; the infrared emitter emits infrared light towards the viewfinder coverage; and the infrared receiver receives the infrared light which returns and obtains the depth image.

In some examples, as shown in FIG. 3, the projection apparatus further comprises a projective region correction part 402 which is connected with the image acquisition part and configured to trigger the image acquisition part according to a correction operation.

In some examples, the image calibration part includes an image processing unit which is configured to correct the image to be displayed according to the relative positional relationship between the projective region and the projection part.

In some examples, the at least one projective region includes a plurality of projective regions; and the calibrating the image to be displayed according to the relative positional relationship includes: segmenting the image to be displayed into a plurality of sub-images to be displayed in each of the plurality of projective regions, so that the projection part respectively projects the plurality of sub-images onto the plurality of projective regions.

In some examples, as shown in FIG. 3, the projection part includes a plurality of sub-projection parts 403 which are respectively disposed on different side surfaces of the projection apparatus.

In some examples, the projective region is covered by a projection film layer.

In some examples, the projection part is a laser scanning projection assembly or a projection assembly including a focusing unit.

In some examples, at least one embodiment of the present disclosure provides a projection system, the projection system comprises the projection apparatus as mentioned above.

In some examples, at least one embodiment of the present disclosure provides a projection method, the projection method comprises: acquiring at least one projective region; acquiring a relative positional relationship between the projective region and a projection part; calibrating an image to be displayed according to the relative positional relationship; and projecting the calibrated image to be displayed onto the projective region.

In some examples, the at least one projective region includes a plurality of projective regions; and the calibrating the image to be displayed according to the relative positional relationship includes: segmenting the image to be displayed into a plurality of sub-images displayed in each of the plurality of projective regions.

In some examples, the acquiring the relative positional relationship between the projective region and the projection part includes: acquiring a depth image of the projective region by utilizing the image acquisition part, and acquiring position information of the projective region in a first coordinate system taking the image acquisition part as a reference object, according to the depth image; calculating a positional relationship between the projection part and the image acquisition part, and obtaining a mapping relationship between the first coordinate system taking the image acquisition part as the reference object and a second coordinate system taking the projection part as a reference object; and converting the position information of the projective region in the first coordinate system into a position information in the second coordinate system according to the mapping relationship, and obtaining the relative positional relationship between the projection part and the projective region.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

At present, a head-up display device is disposed on a driving platform of a vehicle and configured to project vehicle state information and augmented reality information onto a windshield, to be convenient for the driver to view the driving data. However, due to the limited space of a driving platform and the limitation of the driver position, a reflector in the head-up display device needs to have large diameter to meet the driver's requirement for viewing the driving data at various positions in the window, otherwise the driver needs to keep the position unchanged, thereby resulting in driver fatigue and reducing the use experience. Moreover, the large diameter of the reflector will increase the volume of the head-up display device and reduce the utilization rate of the limited space in the vehicle. In addition, it is difficult to manufacture a reflector having large diameter in the related art, and it is easy to increase the production cost.

Figure 1A:
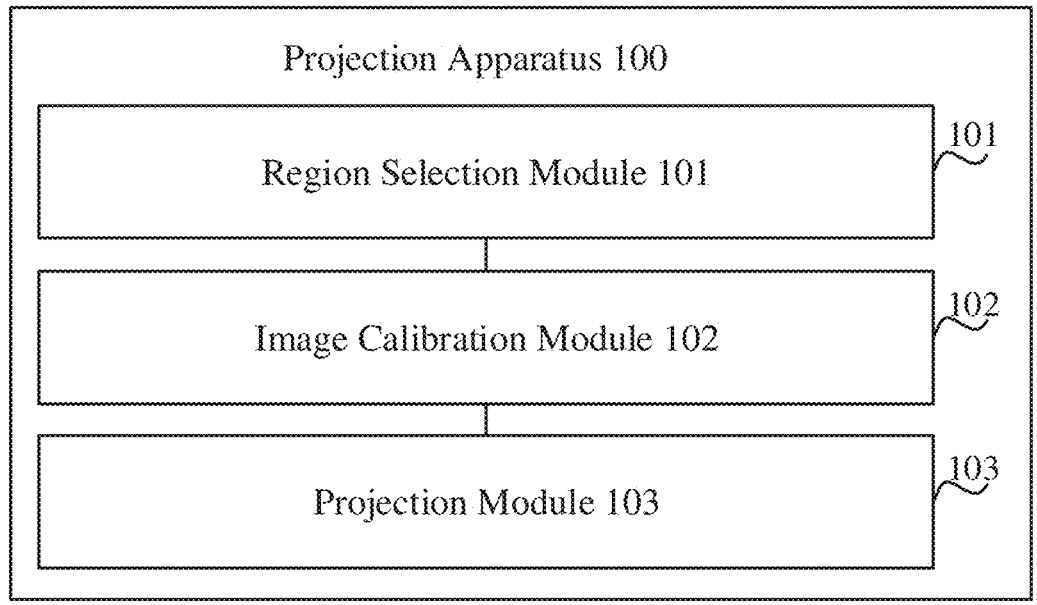
FIGS. 1A and 1B are block diagrams of a projection apparatus provided by an embodiment of the present disclosure.
Figure 1B:
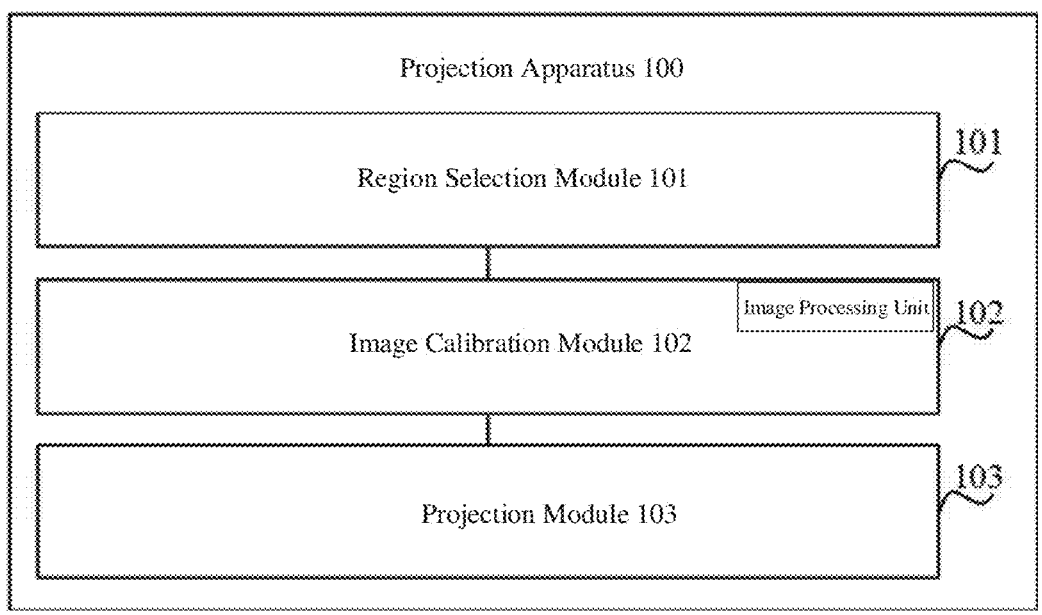

In order to solve the problems in the related art, the embodiment of the present disclosure provides a projection apparatus. FIGS. 1A and 1B are block diagrams of the projection apparatus provided by the embodiment of the present disclosure. As shown in FIGS. 1A and 1B, the projection apparatus comprises a region selection module 101, an image calibration module 102 and a projection module 103. The image calibration module 102 is respectively connected with the region selection module 101 and the projection module 103. For instance, the region selection module, the image calibration module and the projection module here may be respectively a region selection part, an image calibration part and a projection part.

The region selection module 101 is configured to select a projective region and send the projective region (for instance, a position information of the projective region) to the image calibration module 102.

The image calibration module 102 is configured to calibrate an image to be displayed according to the relative positional relationship between the projective region and the projection module and send the calibrated image to be displayed to the projection module 103.

The projection module 103 is configured to project the calibrated image to be displayed onto the projective region.

In one embodiment, the region selection module 101 may be implemented by a hardware circuit such as a central processing unit (CPU), e.g., a singlechip, a digital signal processor (DSP), an ARM chip, or a field programmable gate array (FPGA); or implemented by a software such as a segmentation algorithm, and the implementation process may refer to the content in the subsequent embodiments, which will not be explained here. In some examples, a combination of software and hardware may also be adopted. Those skilled in the art may select the implementation mode and the structural composition of the region selection module 101 according to the specific scene, which is not limited herein.

Figure 3:
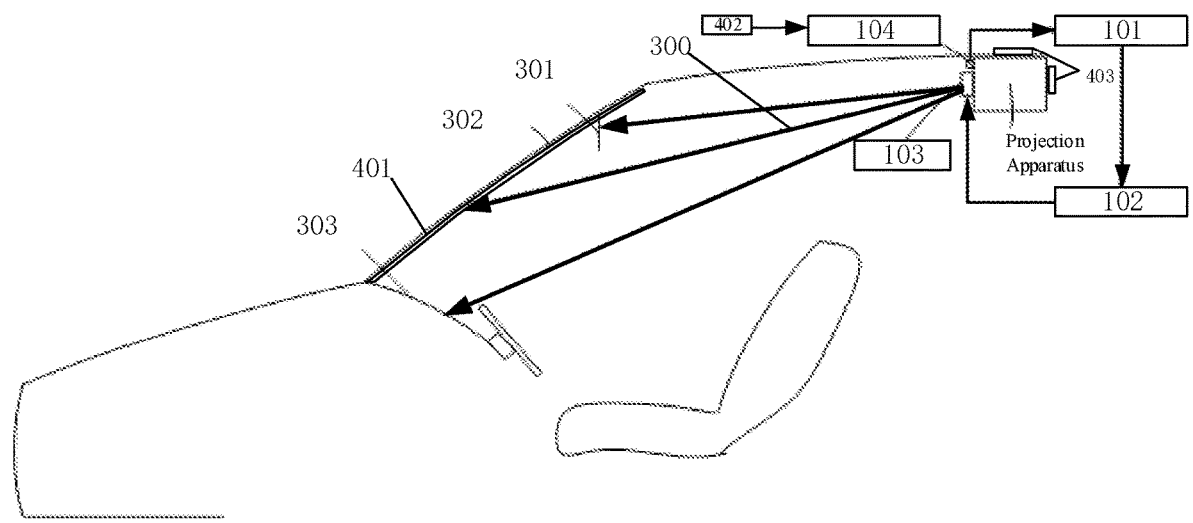
FIGS. 3-5 are schematic diagrams illustrating a case when a projection apparatus provided by an embodiment of the present disclosure is applied in the vehicle scene.

In one embodiment, as shown in FIG. 3, a surface of the projective region is covered by a projection film layer 401. After the image to be displayed is projected onto the projection film layer, the user can have better viewing effect. A material of the projection film layer may be realized by a material in the related art, and a working principle of the projection film layer may refer to the solution in the related art, which is not limited herein. For example, in some examples, the projection film layer may be a holographic projection film, for example, may be formed by a holographic grating.

In one embodiment, a manner of selecting the projective region of the region selection module 101 may include the following two modes:

Mode 1: size comparison. The region selection module 101 receives the image to be displayed sent by the image calibration module, screens out the projective region of which the size is greater than that of the image to be displayed from prestored projective regions according to the size of the image to be displayed, and feeds back the screened projective region to the image calibration module 102.

Figure 2:
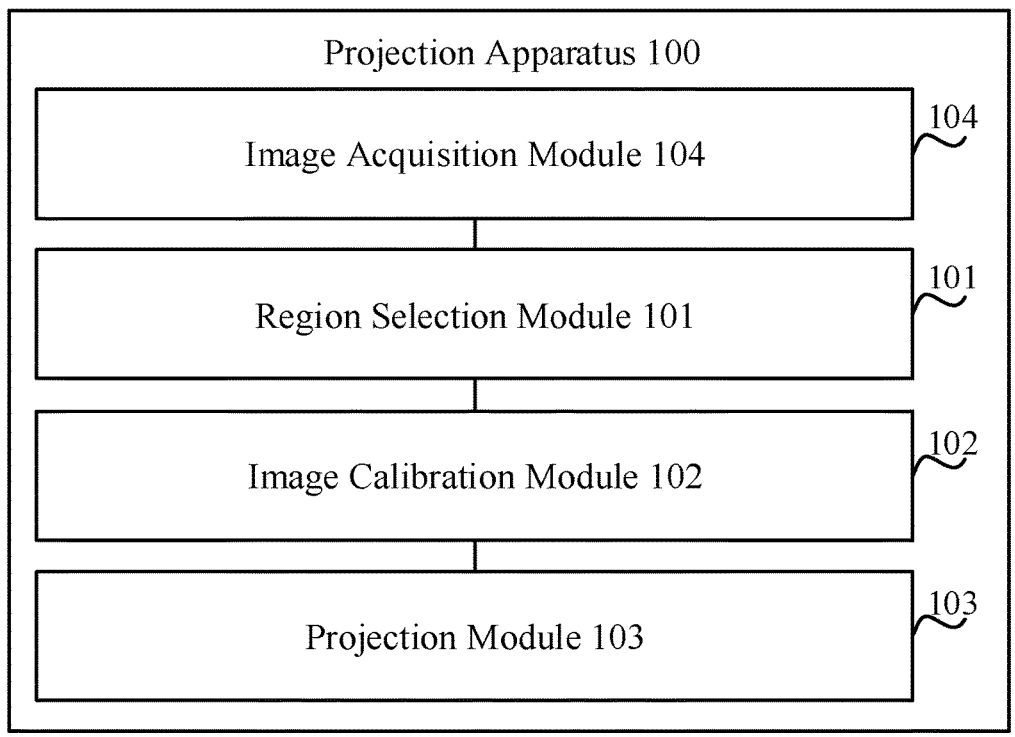
FIG. 2 is a block diagram of another projection apparatus provided by an embodiment of the present disclosure.

Mode 2: real-time acquisition. In this manner, the projection apparatus 100 further comprises an image acquisition module 104. As shown in FIG. 2, the image acquisition module 104 is connected with the region selection module 101. The image acquisition module 104 may acquire a depth image within the viewfinder coverage and send the depth image to the region selection module 101. Data of pixels in the depth image contain depth information. The depth information refers to a distance between positions on different objects within the viewfinder range, corresponding to the pixels, and the image acquisition module 104. For instance, the image acquisition module is an image acquisition part.

The region selection module 101 may segment the depth image according to the depth information in the depth image, screen out the projective region from segmented images, and send the projective region (for instance, position information of the projective region) to the image calibration module 102.

It should be noted that after the projection apparatus 100 is started each time, the region selection module 101 may be executed once or for multiple times, and the image calibration module 103 and the projection module 103 maintain the execution state until image display is completed. Of course, when the projection apparatus comprises the image acquisition module 104, the image acquisition module 104 may be executed once or for multiple times. Those skilled in the art may adjust the working order of the modules according to the scene, so that the region selection module 101, the image calibration module 102, the projection module 103 and the image acquisition module 104 may form the projection apparatus having different connection modes and corresponding projection method, and corresponding solution also falls within the protection scope of the present application.

In one embodiment, the image calibration module 102 may be implemented by a hardware circuit such as a CPU, e.g., a singlechip, a DSP, an ARM chip, or an FPGA; and may also be implemented by a software such as a calibration algorithm, and the implementation process may refer to the subsequent content, which will not be explained here first. In some examples, a combination of software and hardware may also be adopted. Those skilled in the art may select the implementation mode and the structural composition of the image calibration module 102 according to specific scenes, which is not limited herein.

In one embodiment, a manner of acquiring the relative positional relationship between the projective region and the projection module 103 of the image calibration module 102 may include the following three modes.

Mode 1: the image calibration module 102 obtains the relative positional relationship by automatic calculation. After structures of the modules of the projection apparatus are determined and the modules are fixed at predetermined positions, a position of the image acquisition module 104 and a position of the projection module 103 may be directly detected. Thus, the image calibration module 102 may calculate the positional relationship between the projection module 103 and the image acquisition module 104 according to the position of the image acquisition module 104 and the position of the projection module 103. For instance, the positional relationship refers to a mapping relationship between a first coordinate system taking the image acquisition module 104 as a reference object and a second coordinate system taking the projection module 103 as a reference object, that is, points in the first coordinate system may be respectively mapped into the second coordinate system according to the positional relationship.

As the projective region is acquired by the image acquisition module 104, namely the projective region is disposed in the first coordinate system, the image calibration module 102 may calibrate the projective region from the first coordinate system to the second coordinate system according to the positional relationship, and then obtain the relative positional relationship between the projective region and the projection module 103.

Mode 2: the image calibration module 102 reads the prestored relative positional relationship. After structures of the modules in the projection apparatus 100 are determined and the modules are fixed at predetermined positions, the position of the image acquisition module 104 and the position of the projection module 103 may be directly detected. Subsequently, the user manually segments the depth image acquired by the image acquisition module 104 into a plurality of segmented images, and calibrates each segmented image into the second coordinate system. After the region selection module 101 acquires the projective region, the image calibration module 102 may directly read the relative positional relationship between the projective region and the projection module 103. Moreover, the calibrated content of the image to be displayed may refer to the previous content, and no further description will be given here.

Mode 3: a combination of the first mode and the second mode. When the projection apparatus is used for the first time, the image calibration module 102 adopts the first mode to obtain the relative positional relationship and stores the relative positional relationship. When the projection apparatus is subsequently used, the image calibration module 102 may directly read the relative positional relationship from the storage position according to the projective region, and can also realize the solution of the present application.

For how to determine whether the projection apparatus 100 is used for the first time: the image calibration module 102 may detect whether the storage position stores the relative positional relationship when triggered. If not stored, it indicates that the projection apparatus 100 is used for the first time, and the relative positional relationship needs to be acquired according to the mode 1. If stored, it indicates that the projection apparatus 100 is not initially used, and the relative positional relationship is acquired according to the mode 2.

For instance, based on the above three methods of acquiring the positional relationship, in some examples, the acquiring the relative positional relationship between the projective region and the projection part may include: acquiring a depth image of the projective region by utilizing the image acquisition part, and acquiring the position information of the projective region in the first coordinate system in which the image acquisition part is taken as the reference object, according to the depth image; calculating the positional relationship between the projection part and the image acquisition part, and obtaining the mapping relationship between the first coordinate system taking the image acquisition part as the reference object and the second coordinate system taking the projection part as the reference object; and converting the position information of the projective region in the first coordinate system into the position information in the second coordinate system according to the mapping relationship, and obtaining the relative positional relationship between the projection part and the projective region.

It should be understood that the three modes acquiring the relative positional relationship of the image calibration module 102 are described in the embodiment of the present disclosure, and those skilled in the art may select an appropriate mode according to the specific scene, which is not limited here.

In one embodiment, the projection module 103 may be implemented by using a laser scanning projection assembly or a projection assembly including a focusing member. For example, the projection module 103 may use a laser scanning projection assembly which may be a laser scanning projection assembly of a reflector based on Micro-Electro-Mechanical System (MEMS) (the reflector is a micro mirror and has very small volume, and there is no need to increase the caliber), so as to achieve projecting on projection planes of various depths, and to keep the projected image clearly visible and not out of focus. Moreover, for example, the projection module 103 may adopt a projection assembly including a focusing member. In this case, the projection assembly may dynamically adjust the projected image according to the depth of the projection plane, so as to ensure that the projected image in each projective region can be clearly seen.

For instance, according to the embodiment of the present disclosure, the selected projective region may include at least one projective region. In the case of a plurality of projective regions, different projective regions may display the same image and may also display different images, for instance, respectively displaying different image information such as navigation, mileage and speed. In this case, in the process of calibrating the image to be displayed, the image to be displayed may be divided into sub-images to be displayed in various projective regions, so that the projection module may respectively project the plurality of segmented sub-images onto the plurality of projective regions. For instance, the MEMS-based reflector may be utilized to respectively project the image onto different projective regions and keep the projected image clearly seen and not out of focus.

For instance, in some examples, as shown in FIG. 1B, the image calibration module may include an image processing unit which may be configured to correct the image to be displayed according to the relative positional relationship between the projective region and the projection module. For instance, the image to be displayed may be corrected or processed according to the direction, the angle and the distance of the projective region relative to the projection module, so as to avoid the deformation of the image displayed in the projective region.

In one embodiment, the image acquisition module 104 may be one or more of a binocular camera, a time-of-flight (TOF) camera and a structured light camera. Of course, the image acquisition module 104 may also be combined by other elements such as an infrared emitter and an infrared receiver, and can also realize the proposal of the present disclosure. Those skilled in the art may select the structural composition of the image acquisition module according to the specific scene, and no limitation will be given here.

In one embodiment, the projection apparatus may further comprise a projective region correction module. The projective region correction module is connected with the image acquisition module and may trigger the image acquisition module according to the correction operation of the user, so as to achieve the purpose of redetermining the projective region. In actual application, the projective region correction module may be a key and may also be a microphone, a touch screen or a camera, and may be selected according to the specific scene. No limitation will be given here.

It can be seen that in the embodiment, the relative positional relationship between the projective region and the projection module is acquired; the image to be displayed is calibrated according to the relative positional relationship; and the calibrated image to be displayed is projected onto the projective region. In the embodiment, the projection apparatus adopts the projection mode, so that the position of the projective region may be automatically adjusted according to the mounting position, thereby ensuring a larger viewing window and improving the viewing effect. In addition, the projection apparatus does not need to increase the caliber of the reflector, does not increase the volume of the projection apparatus, and is less restricted by the mounting position.

Figure 4:
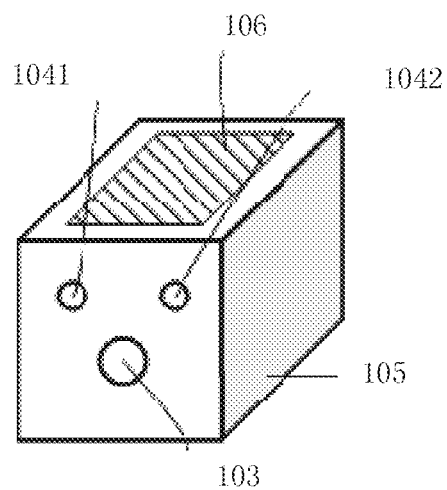
Figure 5:
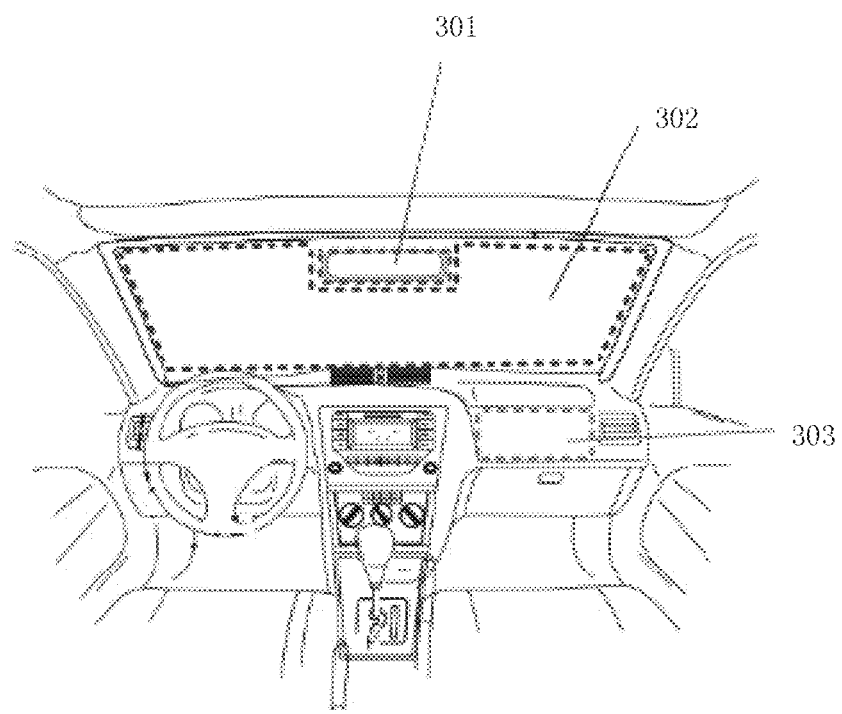

The embodiment of the present disclosure provides a projection apparatus, which is applied to the vehicle projection scene. FIGS. 3 to 5 are schematic diagrams illustrating scene applications as shown in the embodiment of the present disclosure. As shown in FIGS. 3 and 4, the image acquisition module 104 in the projection apparatus may be implemented by a TOF camera or a structured light camera provided with one infrared emitter 1041 and one infrared receiver 1042; the region selection module 101 is implemented by a CPU; the image calibration module 102 is implemented by the CPU; and the projection module 103 is implemented by a projection assembly including a focusing member. Moreover, in the embodiment, a fixing element 106 is disposed on a housing 105 of the projection apparatus, and then the fixing element 106 fixes the projection apparatus on the top of the inside of the vehicle, for instance, a top region between the driver's seat backrest and a copilot seat backrest (a distance from a windshield 302 may be adjusted). Thus, the projective region of the projection apparatus may include a rearview mirror 301, the windshield 302 or a driving platform 303 (for clarity, only a driving platform of the copilot seat is shown). As shown in FIG. 4, description is given in the embodiment by taking the TOF camera or the structured light camera provided with one infrared emitter 1041 and one infrared receiver 1042 as an example. It should be understood that any other image acquisition part of appropriate type may also be adopted to replace the TOF camera or the structured light camera and disposed at a similar position. No further description will be given here.

Figure 6:
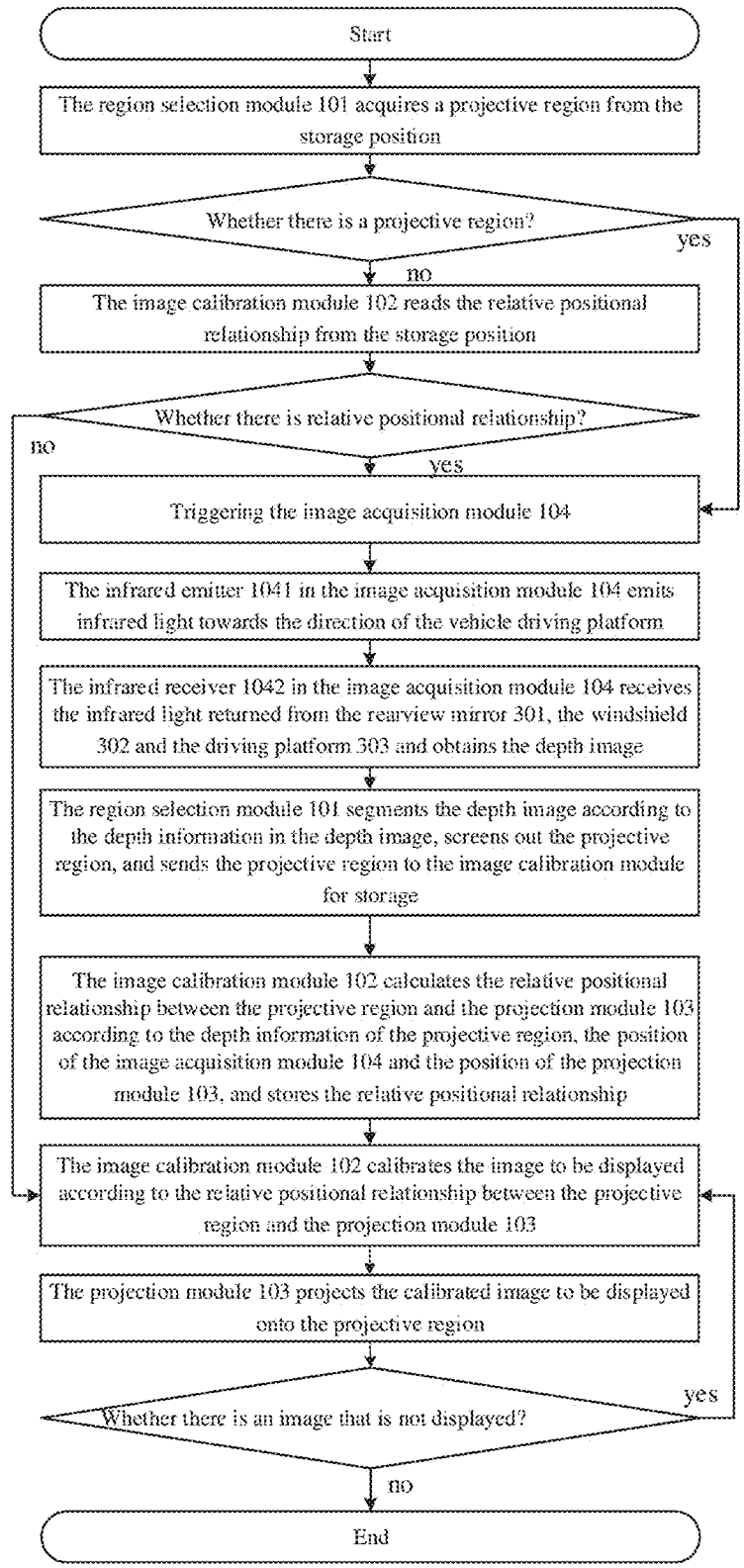
FIG. 6 is a schematic workflow diagram of a projection apparatus in the scenes as shown in FIGS. 3 to 5.

As shown in FIG. 6, the working process of the projection apparatus is as follows:

When started, the region selection module 101 reads the projective region from the storage position, and the image acquisition module 104 is triggered when there is no projective region. When there is a projective region, the image calibration module 102 reads the relative positional relationship between the projective region and the projection module 103 from the storage position. When there is the relative positional relationship, the image calibration module 102 calibrates the image to be displayed according to the relative positional relationship between the projective region and the projection module 103. When there is no relative positional relationship, the image acquisition module 104 is triggered.

After the image acquisition module 104 is triggered, the infrared emitter 1041 emits infrared structured light or a scatter pattern towards a direction of the vehicle's driving platform, and the infrared light is reflected by the rearview mirror 301, the windshield 302 and the driving platform 303 and transmitted to the infrared receiver 1042. The infrared receiver 1042 obtains the depth image after receiving the infrared light. Depth is half of the optical path of the infrared light, in which the optical path of the infrared light is the product of a difference between an emission time and a reception time of the infrared light and a speed of the infrared light.

The region selection module 101 segments the depth image according to the depth information in the depth image. The segmentation principle may be that a region of the same depth is one projective region (may be understood as one plane), and may also be that a region where the depth change is relatively slow (may be compared with the change rate threshold) and a surrounding change rate does not change sharply is taken as one projective region (may be understood as a curved surface). Subsequently, the region selection module selects one from the segmented images as the projective region and sends the projective region to the image calibration module 102, and the projective region is stored into the storage position.

After receiving the projective region, the image calibration module 102 acquires the position of the projection module 103 and the position of the image acquisition module 104, and then calculates the positional relationship between the projection module 103 and the image acquisition module 101; and subsequently, calibrates the projective region from the first coordinate system to the second coordinate system according to the positional relationship between the projection module 103 and the image acquisition module 104, obtains the relative positional relationship between the projection module 103 and the projective region, and stores the relative positional relationship onto the storage position.

For instance, a coordinate of any point P in the projective region in the first coordinate system is $p=(x,y,z)^T$. After the projective region is determined, the coordinate p may be determined. After the positions of the image acquisition module 104 and the projection module are determined, the mapping relationship between the first coordinate system and the second coordinate system is also known as follows:

$$p'=Rp+t$$

wherein, R is a 3×3 orthogonal matrix and the determinant value is equal to 1, indicating rotation transformation, namely:

$$R = \begin{bmatrix} r_{11} & r_{12} & r_{13} \\ r_{21} & r_{22} & r_{23} \\ r_{31} & r_{32} & r_{33} \end{bmatrix};$$

wherein, 9 parameters of the rotation matrix R satisfy the following six constraint conditions:

$$r_{15}^2+r_{12}^2+r_{18}^2=1;$$

$$r_{21}^2+r_{22}^2+r_{28}^2=1;$$

$$r_{31}^2+r_{32}^2+r_{38}^2=1;$$

$$r_{11}r_{21}+r_{22}r_{22}+r_{18}r_{28}=0;$$

$$r_{21}r_{31}+r_{22}r_{32}+r_{23}r_{33}=0;$$

$$r_{31}r_{11}+r_{32}r_{12}+r_{38}r_{18}=0.$$

Moreover, $t(t_x,t_y,t_z)^T$ represents a three-dimensional vector representing one translation transformation, representing the coordinate of the origin of the first coordinate system in the second coordinate system.

The image calibration module 102 may calculate the coordinate of the p point in the second coordinate system according to the relative positional relationship. By repeating the above calculation, the coordinates of all the points in the projective region in the second coordinate system may be obtained, and then the relative positional relationship between the projective region and the projection module 103 may be obtained.

Subsequently, the image calibration module 102 calibrates each frame of image to be displayed according to the relative positional relationship between the projection module 103 and the projective region, and sends the calibrated image to be displayed to the projection module 103.

The projection module 103 projects the calibrated image to be displayed onto the projective region and shows the image to the user.

The image calibration module 102 also detects whether there are still images not displayed, if so, calibrates the image to be displayed continuously, and if not, ends displaying.

Figure 7:
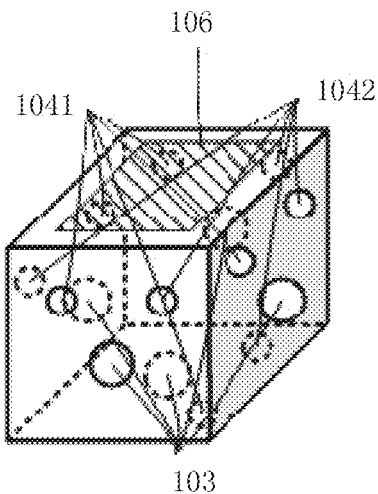
FIG. 7 is a schematic appearance view of a projection apparatus provided by an embodiment of the present disclosure.

It should be noted that the embodiment as shown in FIG. 6 only shows the proposal in which the projection apparatus projects the image towards the driving platform direction. Of course, the projection apparatus may also arrange the image acquisition module and the projection module on different side surfaces (e.g., front, side, back or bottom), and then may project the image in multiple directions. As shown in FIG. 7, if the side surface where the fixing element 106 is located is taken as a top surface and a surface facing the reader is taken as the front, one group of infrared emitter and infrared receiver (namely arranging the image acquisition module) and the projection module 103 are respectively disposed on the front surface, the left side surface, the right side surface, the back surface and the bottom surface of the projection apparatus to achieve the effect of projecting the image in 5 directions. Thus, the projection module can display multiple interactive information such as weather information, news information, entertainment information and game experience in different directions and can provide better use experience for the user.

It should be noted that the image acquisition module, the region selection module, the image calibration module and the projection module in the embodiment of the present disclosure do not have to be separate components, and some functional modules therein may be integrated together. For instance, the region selection module and the image calibration module may be integrated onto the same integrated circuit (IC) chip.

Of course, the projection apparatus provided by the embodiment of the present disclosure not only may be taken as an on-board projection apparatus but also may be taken as an intelligent home projection apparatus, may project the image at home or similar scenes, achieve a purpose of all-aspect information display, and provide better service for the user.

The embodiment of the present disclosure further provides a projection system, which comprises the projection apparatus provided by the embodiment as shown in FIGS. 1A to 7. As the content of the projection apparatus has been described in the above embodiments, no further description will be given here.

Figure 8:
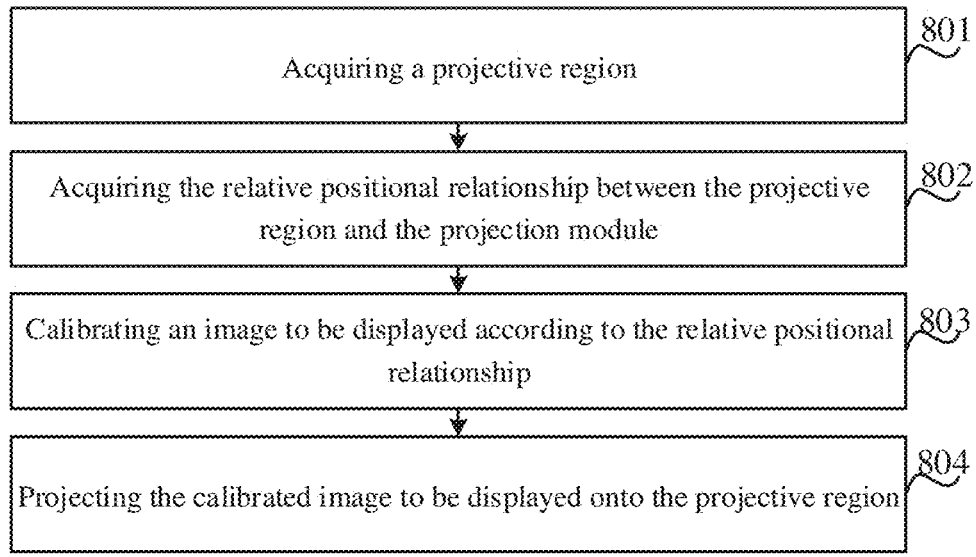
FIGS. 8 and 9 are flowcharts of a projection method provided by an embodiment of the present disclosure.

An embodiment of the present disclosure further provides a projection method, which may be applied to the projection apparatus as shown in FIGS. 1A-7 and, as shown in FIG. 8, comprises:

801: acquiring a projective region;

802: acquiring the relative positional relationship between the projective region and the projection module;

803: calibrating an image to be displayed according to the relative positional relationship; and 804: projecting the calibrated image to be displayed onto the projective region.

In an embodiment, the step S802 includes:

901: acquiring a position of a projection module and a position of an image acquisition module, in which the image acquisition module is configured to acquire a depth image;

902: calculating the positional relationship between the projection module and the image acquisition module, in which the positional relationship refers to the mapping relationship between a first coordinate system taking the image acquisition module as a reference object and a second coordinate system taking the projection module as a reference object; and 903: calibrating the projective region from the first coordinate system to the second coordinate system according to the positional relationship between the projection module and the image acquisition module, and obtaining the relative positional relationship between the projection module and the projective region.

In one embodiment, the step 802 includes: utilizing the image acquisition part to acquire the depth image of the projective region, and acquiring the position information of the projective region in the first coordinate system taking the image acquisition part as the reference object, according to the depth image; calculating the positional relationship between the projection part and the image acquisition part, and obtaining the mapping relationship between the first coordinate system taking the image acquisition part as the reference object and the second coordinate system taking the projection part as the reference object; and converting the position information of the projective region in the first coordinate system into the position information in the second coordinate system according to the mapping relationship, and obtaining the relative positional relationship between the projection part and the projective region.

Figure 9:
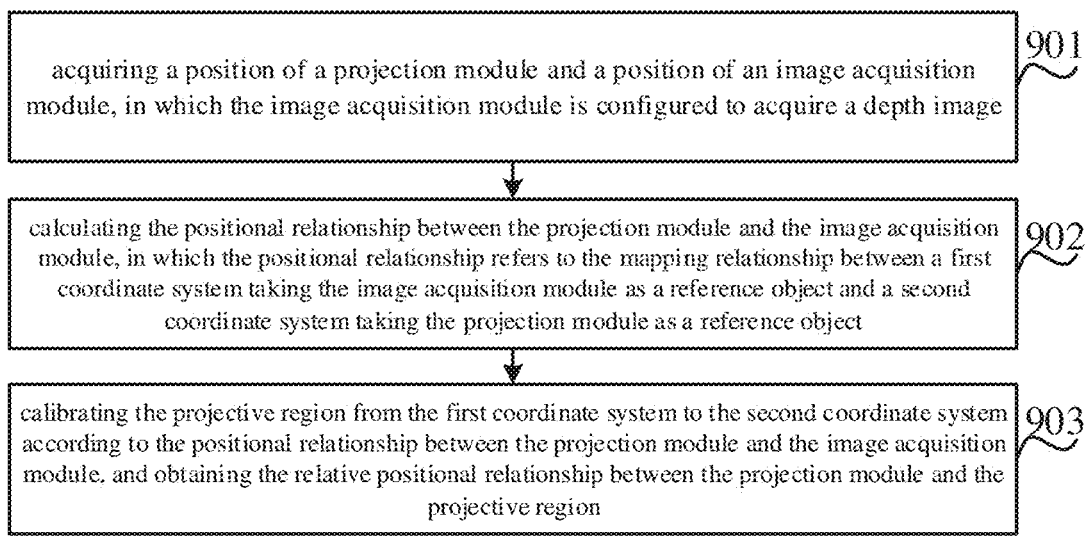

It should be understood that the content of the projection method as shown in FIG. 8 and FIG. 9 has been described in detail in the working process of the embodiment of the projection apparatus as shown in FIGS. 1A to 7. The relevant parts may refer to the content of the embodiment of the projection apparatus, and no further description will be given here.

In the present disclosure, the terms "first" and "second" are used for descriptive purpose only and are not to be understood as indicating or implying the relative importance. The term "plurality" refers to two or more, unless otherwise specifically defined.

What are described above is related to the specific embodiments of the present disclosure only and not limitative to the scope of the disclosure. The protection scope of the disclosure shall be based on the protection scope of the claims.

The invention claimed is:

1. A projection apparatus, comprising a region selection part, an image calibration part and a projection part, wherein
the image calibration part is respectively connected with the region selection part and the projection part;
the region selection part is configured to select at least one projective region and send position information of the projective region to the image calibration part;
the image calibration part is configured to acquire a relative positional relationship between the projective region and the projection part and calibrate an image to be displayed according to the relative positional relationship; and
the projection part is configured to project the calibrated image to be displayed onto the projective region,
wherein the at least one projective region includes a plurality of projective regions; and the calibrating the image to be displayed according to the relative positional relationship includes: segmenting the image to be displayed into a plurality of sub-images to be displayed in each of the plurality of projective regions, so that the projection part respectively projects the plurality of sub-images onto the plurality of projective regions.

2. The projection apparatus according to claim 1, wherein the projection apparatus includes a storage position, the region selection part is configured to acquire the image to be displayed sent by the image calibration part, screen out the projective region from prestored projective regions stored in the storage position according to a size of the image to be displayed, and feed back a position information of the projective region to the image calibration part.

3. The projection apparatus according to claim 2, wherein the projection part includes a plurality of sub-projection parts which are respectively disposed on different side surfaces of the projection apparatus.

4. The projection apparatus according to claim 1, wherein the projection apparatus further comprises an image acquisition part; the image acquisition part is connected with the region selection part and configured to acquire a depth image within a viewfinder coverage and send the depth image to the region selection part; data of pixels in the depth image contain depth information; and
the region selection part is also configured to segment the depth image according to the depth information, screen out the projective region from segmented images, and send the position information of the projective region to the image calibration part,
wherein the image acquisition part includes a TOF camera or a structured light camera; the image acquisition part includes at least one group of infrared emitter and infrared receiver; the infrared emitter emits infrared light towards the viewfinder coverage; and the infrared receiver receives the returning infrared light and obtains the depth image.

5. The projection apparatus according to claim 4, further comprising a projective region correction part which is connected with the image acquisition part and configured to trigger the image acquisition part according to a correction operation.

6. The projection apparatus according to claim 4, wherein the projection part includes a plurality of sub-projection parts which are respectively disposed on different side surfaces of the projection apparatus.

7. The projection apparatus according to claim 4, wherein the projection part includes a plurality of sub-projection parts which are respectively disposed on different side surfaces of the projection apparatus.

8. The projection apparatus according to claim 4, wherein the projection part includes a plurality of sub-projection parts which are respectively disposed on different side surfaces of the projection apparatus.

9. The projection apparatus according to claim 1, wherein the image calibration part includes an image processing unit which is configured to correct the image to be displayed according to the relative positional relationship between the projective region and the projection part.

10. The projection apparatus according to claim 1, wherein the projection part includes a plurality of sub-projection parts which are respectively disposed on different side surfaces of the projection apparatus.

11. The projection apparatus according to claim 1, wherein the projective region is covered by a projection film layer.

12. The projection apparatus according to claim 1, wherein the projection part is a laser scanning projection assembly or a projection assembly including a focusing unit.

13. A projection system, comprising the projection apparatus according to claim 1.

14. A projection method, comprising:
acquiring at least one projective region;
acquiring a relative positional relationship between the projective region and a projection part;
calibrating an image to be displayed according to the relative positional relationship; and
projecting the calibrated image to be displayed onto the projective region,
wherein the at least one projective region includes a plurality of projective regions; and the calibrating the image to be displayed according to the relative positional relationship includes: segmenting the image to be displayed into a plurality of sub-images displayed in each of the plurality of projective regions.

15. The projection method according to claim 14, wherein the acquiring the relative positional relationship between the projective region and the projection part includes:
acquiring a depth image of the projective region by utilizing the image acquisition part, and acquiring position information of the projective region in a first coordinate system taking the image acquisition part as a reference object, according to the depth image;
calculating a positional relationship between the projection part and the image acquisition part, and obtaining a mapping relationship between the first coordinate system taking the image acquisition part as the reference object and a second coordinate system taking the projection part as a reference object; and
converting the position information of the projective region in the first coordinate system into a position information in the second coordinate system according to the mapping relationship, and obtaining the relative positional relationship between the projection part and the projective region,
wherein the image acquisition part includes a TOF camera or a structured light camera; the image acquisition part includes at least one group of infrared emitter and infrared receiver; the infrared emitter emits infrared light towards the viewfinder coverage; and the infrared receiver receives the returning infrared light and obtains the depth image,
in the depth image, a region of a same depth is one projective region or a region where a depth change is relatively slow and a surrounding change rate does not change sharply is one projective region.

16. A projection apparatus, comprising a region selection part, an image calibration part and a projection part, wherein
the image calibration part is respectively connected with the region selection part and the projection part;
the region selection part is configured to select at least one projective region and send position information of the projective region to the image calibration part;
the image calibration part is configured to acquire a relative positional relationship between the projective region and the projection part and calibrate an image to be displayed according to the relative positional relationship; and
the projection part is configured to project the calibrated image to be displayed onto the projective region,
wherein the projection apparatus includes a storage position, the region selection part is configured to acquire the image to be displayed sent by the image calibration part, screen out the projective region from prestored projective regions stored in the storage position according to a size of the image to be displayed, and feed back a position information of the projective region to the image calibration part.

* * * * *